July 25, 1967  A. R. DEVYS  3,332,699
TRAILER FRAME WITH RETRACTABLE JACKS AND REMOVABLE RUNNING GEAR
Filed June 15, 1965  2 Sheets-Sheet 1
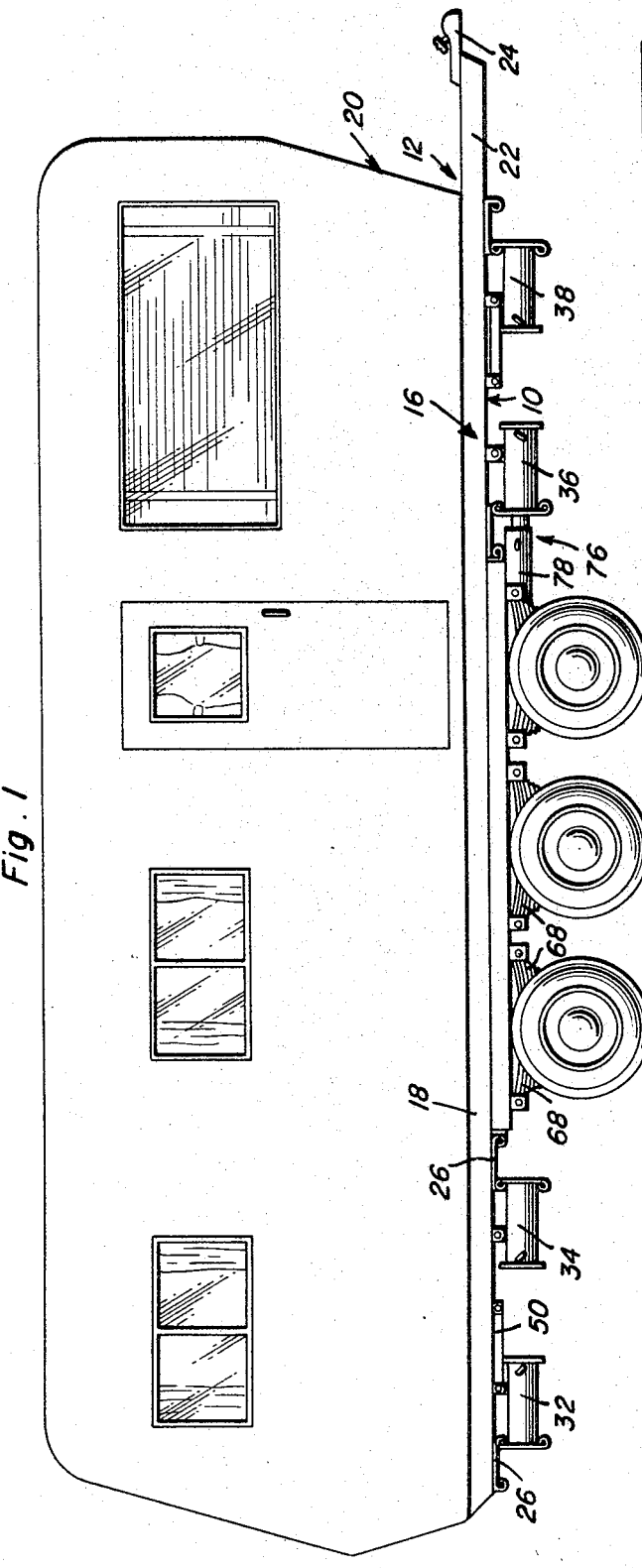
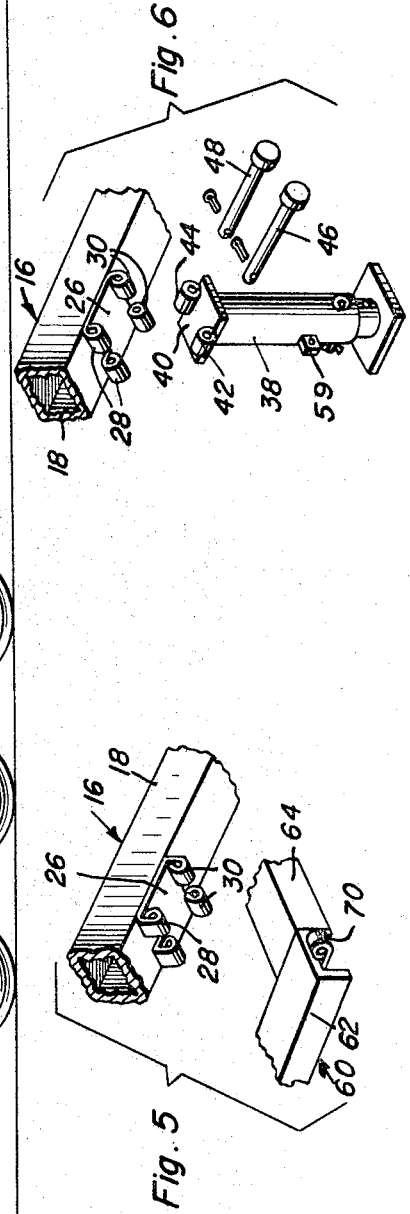
Albert R. Devys
INVENTOR.

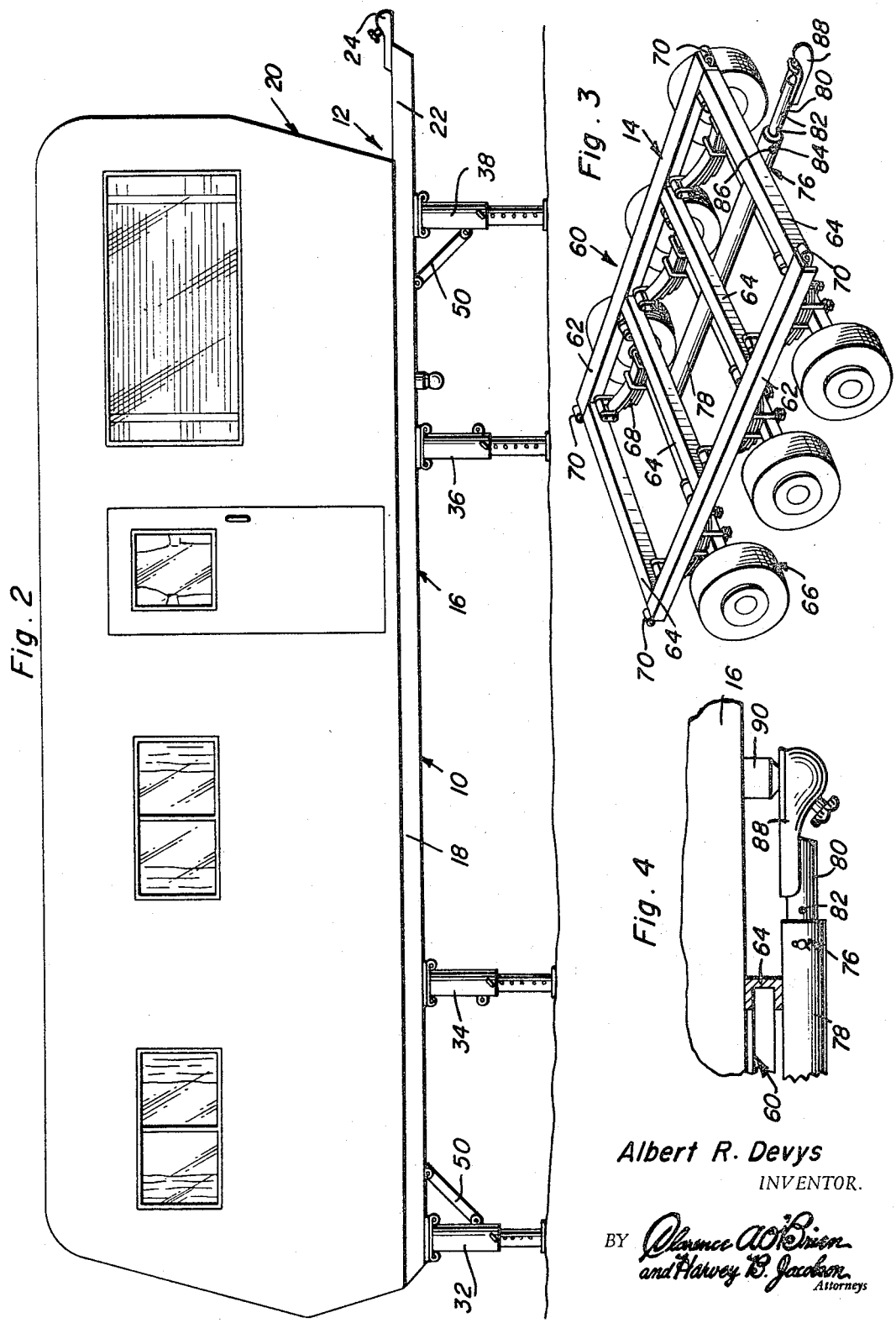

United States Patent Office 3,332,699
Patented July 25, 1967

---

3,332,699
TRAILER FRAME WITH RETRACTABLE JACKS AND REMOVABLE RUNNING GEAR
Albert R. Devys, 507 W. Main St., Fayette, Ohio 43521
Filed June 15, 1965, Ser. No. 464,133
5 Claims. (Cl. 280—81)

This invention relates to novel wheeled trailer running gear and more specifically to a trailer running gear assembly including a frame and a plurality of supporting wheels therefor with means being provided for removably securing the frame of the running gear to the frame of a house or other trailer frame in a manner such that the running gear assembly is held stationary relative to the trailer and functions to rollingly support the latter. The running gear assembly of the instant invention includes means adapting it to be towed behind a towing vehicle when a trailer body is not supported thereon and further adapted for removable securement to a trailer body positioned on the running gear in a retracted position relative to the latter in order that the conventional trailer tongue supported by the trailer frame independently of the running gear assembly may be utilized to trail the combined trailer and running gear assemblies behind a towing vehicle.

The present invention also encompasses the provision of a special trailer frame to be utilized in conjunction with the running gear assembly referred to above and this special trailer frame includes several retractable jacks for supporting the trailer frame in any desired location and in an elevated position above the ground so that the above mentioned running gear assembly may be removed and utilized to move another trailer frame from one location to another. Still further, the means provided for securing the running gear assembly beneath an associated trailer frame includes means also operative to retain at least some of the jacks of the trailer frame in the upright operative position when the running gear assembly has been removed from beneath the trailer frame.

A main object of this invention is to provide a combined trailer and running gear assembly therefor constructed in a manner whereby the running gear may be removed whenever desired in order that it may also be utilized to transport another trailer body from one location to another.

Another object of this invention is to provide a combination in accordance with the immediately preceding object including means by which the running gear assembly is adapted to be towed behind a vehicle when it is not supporting a trailer body and which means is also adapted for removable securement to an associated trailer body positioned on the running gear assembly when the combined trailer and running gear unit is being trailed from one location to another by means of an appropriate tongue carried by the trailer body independently of the running gear assembly.

A final object of this invention to be specifically enumerated herein is to provide a combined trailer and running gear unit in accordance with the preceding objects which will conform to conventional forms of manufacture, be of simple construction and easy to use so as to provide a device that will be economically feasible, long lasting and relatively troublefree in operation.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIGURE 1 is a side elevational view of the combined trailer and running gear unit of the instant invention shown with the supporting jacks of the trailer body in a raised inoperative position;

FIGURE 2 is a side elevational view of the trailer of the instant invention shown supported from the extendable jacks and with the running gear assembly removed;

FIGURE 3 is a perspective view of the running gear assembly portion of the instant invention on somewhat of a reduced scale;

FIGURE 4 is a fragmentary enlarged longitudinal vertical sectional view showing the manner in which the tongue of the running gear assembly may be removably secured to the associated trailer frame when the running gear assembly is being utilized to rollingly support the trailer frame;

FIGURE 5 is a fragmentary exploded perspective view of adjacent portions of the trailer frame and running gear assembly showing the manner in which the latter may be removably secured to the trailer frame; and FIGURE 6 is a fragmentary exploded perspective view of the trailer frame showing the manner in which one of the extendable jack assemblies is removably secured to the trailer frame.

Referring now more specifically to the drawings the numeral 10 generally designates the combined trailer and running gear unit of the instant invention. The trailer is generally designated by the reference numeral 12 and the running gear assembly is generally designated by the reference numeral 14.

The trailer 12 includes a main frame generally referred to by the reference numeral 16 including a pair of opposite side longitudinal frame members 18 which may be interconnected in any suitable manner. A trailer body generally referred to by the reference numeral 20 is secured to the trailer frame 16 in any convenient manner and may be of any conventional type of trailer body.

The frame 16 of the trailer 12 includes a forwardly projecting tongue 22 having a female socket hitch member 24 of conventional design mounted on its forward end. In addition, the frame members 18 of the frame 16 each have four mounting brackets 26 mounted thereon and each bracket may be seen to include two pairs of aligned journal defining members 28 and 30. Four longitudinally extendable jacks 32, 34, 36 and 38 are supported from each frame member 18 by the mounting brackets 26 and it may be seen that each of the jacks includes an upper mounting plate 40 and a pair of journal defining members 42 and 44 which are receivable between and alignable with the corresponding journal defining members 28 and 30 of the associated mounting bracket 26. The journal defining members 42 and 44 of each jack are supported from or formed as an integral portion of the corresponding plate 40. A pair of removable pins 46 and 48 are secured through each set of aligned journal defining members 28 and 42 and 30 and 34 to secure the jacks to the mounting brackets 26.

It will, of course, be noted that should one of the pins 46 or 48 be removed, the associated jack is then pivotally supported from the associated mounting bracket and may be swung through a vertical plane extending longitudinally of the trailer 12 from the depending and upright positions illustrated in FIGURE 2 of the drawings to the horizontally disposed retracted positions illustrated in FIGURE 1 of the drawings. The jacks 32 and 38 each include a disengageable diagonal brace 50 for maintaining the jacks 32 and 38 in their operative positions and it will be noted that each of the jacks includes an apertured ear 59 which may be suitably secured to the adjacent portions of the frame 16 when the jacks are to be retained in their horizontally disposed and inoperative positions illustrated in FIGURE 1 of the drawings.

The running gear assembly 14 includes a main frame generally referred to by the reference numeral 60 including a pair of longitudinal members 62 interconnected by means of a plurality of transverse frame members 64. A plurality of wheeled axle assemblies 66 are yieldingly supported from the frame 60 by means of spring assemblies 68 and the opposite ends of each of the longitudinal members 62 includes a journal defining member 70 which is receivable between and alignable with one pair of the journal members carried by each mounting bracket 26 which supports the jacks 34 and 36. In this manner, the adjacent pairs of journal members of the mounting brackets for the jacks 34 and 36 may be utilized to secure the frame 60 beneath the frame 16 when the jacks 34 and 36 are in the raised inoperative positions illustrated in FIGURE 1 of the drawings. It is, of course, to be understood that the corresponding pins utilized to secure the jacks 34 and 36 in their operative positions are also used and passed through the journal defining members 70 aligned with the adjacent pairs of journal defining members of the mounting brackets 26 which normally support the jacks 34 and 36 in the operative positions.

The frame 60 further includes a trailer tongue generally referred to by the reference numeral 76 including a fixed outer cylindrical member 78 and an extendable inner cylindrical member 80 which is provided with a plurality of longitudinally spaced apertures 82 registrable with corresponding apertures 84 formed in the tubular member 78. Of course, any suitable type of locking pin 86 may be utilized to retain the tubular member 80 in adjusted extended positions by passing the pin 86 through the apertures 84 and a selected one of the sets of apertures 82 formed in the extendable tubular member 80.

Inasmuch as the apertures 82 and 84 lie on diameters of the tubular members 80 and 78, respectively, the tubular member 80 may not only be extended and secured in adjusted extended positions but also rotated 180 degrees about its longitudinal axis. Accordingly, the female socket hitch member 88 carried by the forward end of the tubular member 80 may either face downwardly as illustrated in FIGURE 13 of the drawings or upwardly as illustrated in FIGURE 4 of the drawings. In the upwardly facing position illustrated in FIGURE 4 the female socket hitch member 88 is removably engageable with a depending and downwardly facing male ball member 90 carried by the frame 16 thereby further securing the frame 60 to the frame 16.

In operation, assuming that the unit 10 is in the operative form illustrated in FIGURE 1 of the drawings, the tongue 12 may be readily coupled to a towing vehicle by means of the socket hitch member 24 in order to tow the unit 10 from one location to another. Thereafter, should it be desired to utilize the running gear assembly 14 to support and move another trailer frame, the jacks 32 and 38 may be pivoted toward and locked in the operative positions illustrated in FIGURE 2 of the drawings and caused to support the frame 16 in an elevated position after the pins securing the frame 50 to the frame 16 have been removed. Thereafter, the female socket hitch member 88 may be removed from engagement with the hitch member 90 and the running gear 14 may be withdrawn from beneath the frame 16. Then, the jacks 34 and 36 may be pivoted to and locked in their operative positions and also actuated to support a portion of the weight of the trailer 12. Thereafter, the tubular member 80 may be rotated 180 degrees so as to have the female socket hitch member 88 face downwardly, the length of the tongue 76 may be adjusted as desired, and the female socket hitch member 88 may be operatively connected to the ball hitch of a towing vehicle and towed to any other location for the purpose of supporting and transporting another trailer.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. In combination with a mobile home trailer frame including a first forwardly projecting tongue having a trailer hitch assembly thereon, a wheeled running gear assembly removably secured beneath said frame, comprising the sole wheeled support for said frame when it is being trailed and including a second forwardly projecting tongue, the forward end of said second tongue terminating beneath said frame, said frame including a first hitch member, spaced rearward of the forward end of said frame, said second tongue including a second hitch member removably engaged with said first hitch member, said second hitch member including means adapted for removable engagement with a third compatible hitch member on a towing vehicle when said frame is removed and only said running gear is being trailed.

2. In combination with a trailer frame including a first forwardly projecting tongue having a trailer hitch assembly thereon, a wheeled running gear assembly, coacting means carried by said frame and assembly removably securing the latter beneath said frame, a plurality of upstanding supporting jacks, coacting means carried by said frame and said jacks securing the upper ends of said jacks to said frame for pivotal movement between first depending operative positions and second raised horizontally disposed positions, the last mentioned coacting means also including means releasably securing at least some of said jacks in their operative positions and also including means operative to releasably secure said running gear assembly beneath said frame when said same jacks are disposed in their inoperative position.

3. In combination with a trailer frame including a first forwardly projecting tongue having a trailer hitch assembly thereon, a wheeled running gear assembly removably secured beneath said frame, comprising the sole wheeled support for said frame when it is being trailed and including a second forwardly projecting tongue, the forward end of said second tongue terminating beneath said frame, said frame including a first hitch member spaced rearward of the forward end of said frame, said second tongue including a second hitch member removably engaged with said first hitch member, said second hitch member including means adapted for removable engagement with a third compatible hitch member on a towing vehicle when said frame is removed and only said running gear is being trailed, said second tongue including a first elongated section mounted in fixed position on said wheeled running gear assembly and a second elongated section shiftable longitudinally of said first section and releasably securable in adjusted position relative to said first section.

4. The combination of claim 3 wherein said second hitch member comprises a female socket member and is supported from said second section, said second section being also supported from said first section for adjusted rotated positioning about its longitudinally axis relative to said first section.

5. The combination of claim 4 wherein said first hitch member comprises a downwardly projecting ball member removably receivable in said socket member.

References Cited

UNITED STATES PATENTS

| | | | |
|---|---|---|---|
| 2,589,842 | 3/1952 | Mittell | 280—29 |
| 2,731,276 | 1/1956 | Cross | 280—423 |
| 2,834,599 | 1/1958 | Sarchet | 280—415 |
| 2,899,237 | 8/1959 | Nash | 280—415 |
| 2,926,930 | 3/1960 | Rease | 280—475 |
| 2,934,373 | 4/1960 | Doty | 214—515 |
| 3,254,914 | 6/1960 | Steck | 280—81 |

KENNETH H. BETTS, *Primary Examiner.*